United States Patent
Garin

(10) Patent No.: US 7,548,200 B2
(45) Date of Patent: Jun. 16, 2009

(54) EPHEMERIS EXTENSION METHOD FOR GNSS APPLICATIONS

(75) Inventor: Lionel Garin, Palo Alto, CA (US)

(73) Assignee: Nemerix SA, Manno (CH)

( * ) Notice: Subject to any disclaimer, the term of this patent is extended or adjusted under 35 U.S.C. 154(b) by 112 days.

(21) Appl. No.: 11/738,656

(22) Filed: Apr. 23, 2007

(65) Prior Publication Data

US 2007/0247354 A1  Oct. 25, 2007

Related U.S. Application Data

(60) Provisional application No. 60/794,102, filed on Apr. 24, 2006, provisional application No. 60/815,838, filed on Jun. 23, 2006, provisional application No. 60/888,232, filed on Feb. 5, 2007.

(51) Int. Cl.
G01S 5/14 (2006.01)

(52) U.S. Cl. .................... 342/358; 342/357.02

(58) Field of Classification Search ............. 342/358, 342/357.02, 342.03, 357.13
See application file for complete search history.

(56) References Cited

U.S. PATENT DOCUMENTS

| | | | |
|---|---|---|---|
| 5,323,322 A | 6/1994 | Mueller et al. | |
| 5,917,444 A | 6/1999 | Loomis et al. | |
| 6,016,117 A | 1/2000 | Nelson, Jr. | |
| 6,058,338 A | 5/2000 | Agashe et al. | |
| 6,064,336 A | 5/2000 | Krasner | |
| 6,075,987 A | 6/2000 | Camp, Jr. et al. | |
| 6,128,501 A | 10/2000 | Ffoulkes-Jones | |
| 6,211,819 B1 | 4/2001 | King et al. | |
| 6,222,483 B1 | 4/2001 | Twitchell et al. | |
| 6,225,945 B1 | 5/2001 | Loomis | |
| 6,285,315 B1 | 9/2001 | Pratt | |
| 6,313,787 B1 | 11/2001 | King et al. | |
| 6,323,803 B1 | 11/2001 | Jolley et al. | |
| 6,400,314 B1 | 6/2002 | Krasner | |
| 6,437,734 B1 | 8/2002 | McBurney et al. | |
| 6,510,387 B2 | 1/2003 | Fuchs et al. | |
| 6,542,820 B2 | 4/2003 | LaMance et al. | |
| 6,560,534 B2 | 5/2003 | Abraham et al. | |
| 6,567,712 B1 * | 5/2003 | Rog et al. ............ | 342/357.02 |

(Continued)

FOREIGN PATENT DOCUMENTS

GB  2 380 343 A  4/2003

(Continued)

OTHER PUBLICATIONS

S.S. Russell et al., "Control Segment and User Performance", Navigation, vol. I, 1980, pp. 74-80.

(Continued)

Primary Examiner—Thomas H Tarcza
Assistant Examiner—Fred H Mull
(74) Attorney, Agent, or Firm—Foley & Lardner LLP

(57) ABSTRACT

Systems, methods and devices for improving the performance of Global Navigation Satellite System (GNSS) receivers are disclosed. In particular, the improvement of the ability to calculate a satellite position or a receiver position where a receiver has degraded ability to receive broadcast ephemeris data directly from a GNSS satellite is disclosed. Correction terms can be applied to an approximate long-term satellite position model such as the broadcast almanac.

19 Claims, 4 Drawing Sheets

U.S. PATENT DOCUMENTS

| | | | |
|---|---|---|---|
| 6,587,789 B2 | 7/2003 | van Diggelen | |
| 6,618,671 B2 | 9/2003 | Dooley et al. | |
| 6,642,884 B2 | 11/2003 | Bryant et al. | |
| 6,650,288 B1 | 11/2003 | Pitt et al. | |
| 6,651,000 B2 | 11/2003 | van Diggelen et al. | |
| 6,670,915 B1 | 12/2003 | McBurney et al. | |
| 6,671,620 B1 | 12/2003 | Garin et al. | |
| 6,701,253 B2 | 3/2004 | Edwards et al. | |
| 6,704,651 B2 | 3/2004 | van Diggelen | |
| 6,829,535 B2 | 12/2004 | van Diggelen et al. | |
| 6,853,916 B2 | 2/2005 | Fuchs et al. | |
| 6,882,908 B2 | 4/2005 | Laurichesse | |
| 6,937,865 B1 | 8/2005 | Bloebaum et al. | |
| 6,992,617 B2 | 1/2006 | Diggelen et al. | |
| 7,142,147 B2 | 11/2006 | Holly | |
| 7,142,157 B2 | 11/2006 | Garin et al. | |
| 2002/0068997 A1 | 6/2002 | Agashe et al. | |
| 2002/0168985 A1 | 11/2002 | Zhao et al. | |
| 2002/0188403 A1 | 12/2002 | LaMance et al. | |
| 2002/0190898 A1 | 12/2002 | Abraham et al. | |
| 2004/0263386 A1 | 12/2004 | King et al. | |
| 2005/0250516 A1* | 11/2005 | Shim | 455/456.1 |
| 2006/0036680 A1* | 2/2006 | Shim | 709/203 |
| 2007/0299609 A1 | 12/2007 | Garin et al. | |
| 2008/0186228 A1 | 8/2008 | Garin et al. | |

FOREIGN PATENT DOCUMENTS

WO    WO 2007/099196 A1    9/2007

OTHER PUBLICATIONS

NAVSTAR Global Positioning System, Navstar GPS Space Segment/Navigation User Interfaces, Interface Specification IS-GPS-200, Revision D, IRN-200D-001, Mar. 7, 2006, p. 1-193.

\* cited by examiner

EPHEMERIS EXTENSION METHOD FOR GNSS APPLICATIONS

CROSS-REFERENCE TO RELATED PATENT APPLICATIONS

This specification is related to and claims the benefit of U.S. Provisional Application No. 60/794,102, filed Apr. 24, 2006, which is hereby incorporated by reference. This specification is further related to U.S. Provisional Applications No. 60/815,838 filed Jun. 23, 2006 and 60/888,232 filed Feb. 5, 2007, both of which are also hereby incorporated by reference.

BACKGROUND OF THE INVENTION

The present invention relates generally to the field of Global Navigation Satellite Systems (GNSS) for navigation, such as the Global Positioning System (GPS) or Galileo.

In a GNSS system, satellites in orbit around the Earth broadcast signals that can be received by a receiver equipped to detect them. The signals are transmitted such that a receiver can determine, under adequate signal conditions, the time of transmission of the signal. By receiving four such signals, the receiver can determine the local time and its own position in a three-dimensional coordinate system.

Such systems often rely on the ability to determine the distance between a satellite and a receiver. By knowing three such distances, an accurate estimate of position can be made by determining the most likely intersection point of three spheres, each centered on a particular satellite and having a radius equal to the measured distance from the satellite to the receiver.

In order to make such a position determination, it is of course necessary for the receiver to have an estimate of each satellite's location. Such location estimates are generated with the help of satellite ephemeris data, which is data that is usable to estimate a satellite's position.

Such satellite ephemeris data is generally stored in the form of parameters which can be used in a known model of the satellite's orbit to generate a position estimate as a function of time. For example, the ephemeris calculations for GPS are described in the document GPS-ICD-200C which is hereby incorporated by reference.

Ephemeris data in the GPS system, for example, are broadcast by each satellite and come in two forms. First, GPS satellites broadcast "almanac data", which are a form of ephemeris data, although they are not generally referred to as such in the art. Almanac data are intended to be used to determine a rough estimate for a satellite's position for a period of more than a few hours after downloading. This can be useful for the receiver, for example, to determine which satellites are in the receiver's field of view, if the receiver also has a rough estimate of its own position. Almanac data are typically accurate for a few months to within a few kilometers.

GPS satellites also broadcast a more precise set of data referred to as "ephemeris data". GPS ephemeris data are typically accurate for a few hours to within a few meters. After a few hours, the accuracy of this data degrades rapidly, however.

Both GPS almanac and GPS ephemeris data are broadcast by each satellite as part of a navigation data message that is superimposed upon a CDMA pseudorandom noise code. The ephemeris data for a particular satellite take typically (open sky—no visibility interruption) 30seconds to download. They cannot be downloaded if the signal is weak (less than −145 dBm). In weak signal conditions, ephemeris data are typically transmitted to the (A)-GPS receiver from an assistance network. Under low signal power conditions, such as those experienced indoors, it is often very difficult to recover the GPS navigation message and thus to recover GPS ephemeris data. This means that GPS receivers which have not been allowed a clear view of the sky for several hours will experience a degradation in their position solution accuracy based on inaccurate estimates of each satellite's current position.

Thus, when a vehicle with a PND (Portable Navigation Device) or GPS receiver mounted on the dashboard or the windshield is parked overnight in an indoor garage, the GPS functions usually cannot deliver a position until quite a long time after the vehicle leaves the garage the next day. The ephemeris data are outdated because of the GPS OFF duration of more than 4 hours (the usual maximum validity period for broadcast ephemerides). Here the term "valid" means producing an error within a preset tolerance. The GPS section takes a long time (up to 10 minutes) in urban canyon environments to recover the broadcast ephemerides from the satellites, due to the low signal level conditions, and the often highly interrupted nature of the received signals. No fix is possible until the broadcast ephemerides are recovered, even if the satellites are tracked.

Thus there is currently a need to extend and improve the accuracy of ephemeris data and the length of time during which ephemeris data can provide an accurate solution.

SUMMARY OF THE INVENTION

One embodiment of the invention relates to a method for improving the accuracy of a receiver position, comprising applying a correction to almanac data. Optionally, the method may be so performed that the step of applying a correction to almanac data comprises obtaining a correction term from a prediction file and applying the term to an estimated satellite position. The method may also be performed such that a corrected estimated satellite position with an accuracy of few meters results, less than 30 meters but preferably less than 5 meters, from the step of applying a correction to almanac data accurate to within about two kilometers. Preferably, the correction is based on data which is received from a network; and the data allows the corrected estimated satellite position to be made accurate to within few meters within seven days after a reception time of the data from the network.

Certain embodiments of the invention relate to a method for generating an extended ephemeris prediction file, comprising: obtaining data comprising a prediction of a satellite orbit; computing correction terms related to a difference between the prediction of a satellite orbit and a second prediction resulting from almanac data; and wherein the prediction file is valid for at least seven days and comprises less than 60480 Bytes. The method can optionally be carried out such that the step of computing correction terms related to a difference between the prediction of a satellite orbit and a second prediction resulting from almanac data further comprises using both a harmonic model and a polynomial model. The method can further comprise the step of computing correction terms for satellite clock data and the step of transmitting the prediction file over a Secure User Plane Location (SUPL) network. Preferably, the prediction file comprises less than one kilobyte per day of validity. In a preferred embodiment, the step of computing correction terms related to a difference between the prediction of a satellite orbit and a second prediction resulting from almanac data further comprises applying a least squares methodology to minimize the difference between the prediction of satellite orbit and the second prediction, and further comprises weighting data from the prediction of satellite orbit that is further in the future less than data from the prediction of satellite orbit that is nearer in the future.

Still further embodiments of the invention relate to a computer readable medium having computer code embedded therein that, when executed, would carry out a method for generating an extended ephemeris prediction file, comprising: obtaining data comprising a prediction of a satellite orbit; computing correction terms related to a difference between the prediction of a satellite orbit and a second prediction resulting from almanac data; wherein the prediction file is valid for at least seven days and comprises less than 60480 Bytes. The method carried out by the instructions can be such that the step of computing correction terms related to a difference between the prediction of a satellite orbit and a second prediction resulting from almanac data further comprises using both a harmonic model and a polynomial model. Optionally, the method carried out by the instructions further comprises the step of computing correction terms for satellite clock data and transmitting the prediction file over a SUPL network. In a preferred embodiment, the prediction file comprises less than one kilobyte per day of validity. Preferably, the step of computing correction terms related to a difference between the prediction of a satellite orbit and a second prediction resulting from almanac data further comprises applying a least squares methodology to minimize the difference between the prediction of satellite orbit and the second prediction and weighting data from the prediction of satellite orbit that is further in the future less than data from the prediction of satellite orbit that is nearer in the future.

Still other embodiments of the invention relate to a GNSS receiver, comprising: a communications port for receiving an almanac correction model; a memory for storing almanac data; circuitry for receiving GNSS signals; and a processor for calculating the position of the receiver based on the received GNSS signals and the position of a GNSS transmitter as calculated from almanac data and the almanac correction model. Optionally, the processor for calculating the position of the receiver based on the received GNSS signals and the position of the GNSS transmitters as calculated from almanac data and the almanac correction model is configured to calculate a corrected estimated GNSS transmitter position based on a harmonic correction model and a polynomial correction model.

DETAILED DESCRIPTION OF THE PREFERRED EMBODIMENTS

"Ephemeris Extension" is a technology that allows predicting a set of ephemeris over a period of time much longer than the original 2 hours, typically days. After 4 days the extension over time implies a loss in accuracy with respect to a position calculated from real ephemeris. With a good Ephemeris Extension, the Time To First Fix (TTFF) is always in the 5-15 seconds, in all conditions, which means that there are no more cold or warm starts. The impact is evident in situations where the receiver is switched on after a long period of time (>2 hours) in particular in a difficult environment (e.g., an urban canyon). In weak signal environments fix is still possible without real-time assistance data. Over longer periods, it is not necessary to have real-time assistance, if the user can accept a less accurate fix (after 4 days).

Referring again to the example of the vehicle leaving the parking garage, embodiments of the present invention would allow a first fix within at most 5-10 seconds after the vehicle leaves the garage. One principle is to store within the GPS receiver a set of long-validity ephemerides, which are loaded by other means than broadcast navigation messages (e.g. Internet connection, wireless connection, download of a file). The long-validity ephemerides usually come from a knowledge of the precise current position of a satellite, velocity and acceleration obtained from actual measurements made at reference stations. The position is propagated using an accurate force model (Precise Earth Gravity Model, Temporal Changes in Earth's Gravity, Sun and Moon Gravitational Effects, Solar Radiation Pressure, Yaw Bias Correction, etc.). A satellite clock prediction is also made, including a current clock offset, a drift model and drift rate model. There is also a random element in the satellite clocks that can not be accurately predicted.

The raw result of the prediction phase is a sequence of accurate predicted positions per satellite typically every 15 minutes, plus a clock bias model. This information then needs to be compacted to be sent to the GPS receiver where it will be de-compacted and used for navigation.

Embodiments of the present invention comprise using a good long term model of overall satellite orbit (almanac), and computing an estimate of the correction to apply to the almanac model. These corrections are quite small (usually 2 km or less), are very smooth (no high frequency terms, so that they can be captured in a relatively small number of parameters). The corrections can have harmonic terms, which optimally have a period equal to the revolution period of the satellite or multiples thereof, plus a polynomial correction composed of an initial offset term, a linear drift term and a second order term, reflecting the drift rate. Further terms are possible, depending on the accuracy desired.

Figure 1:
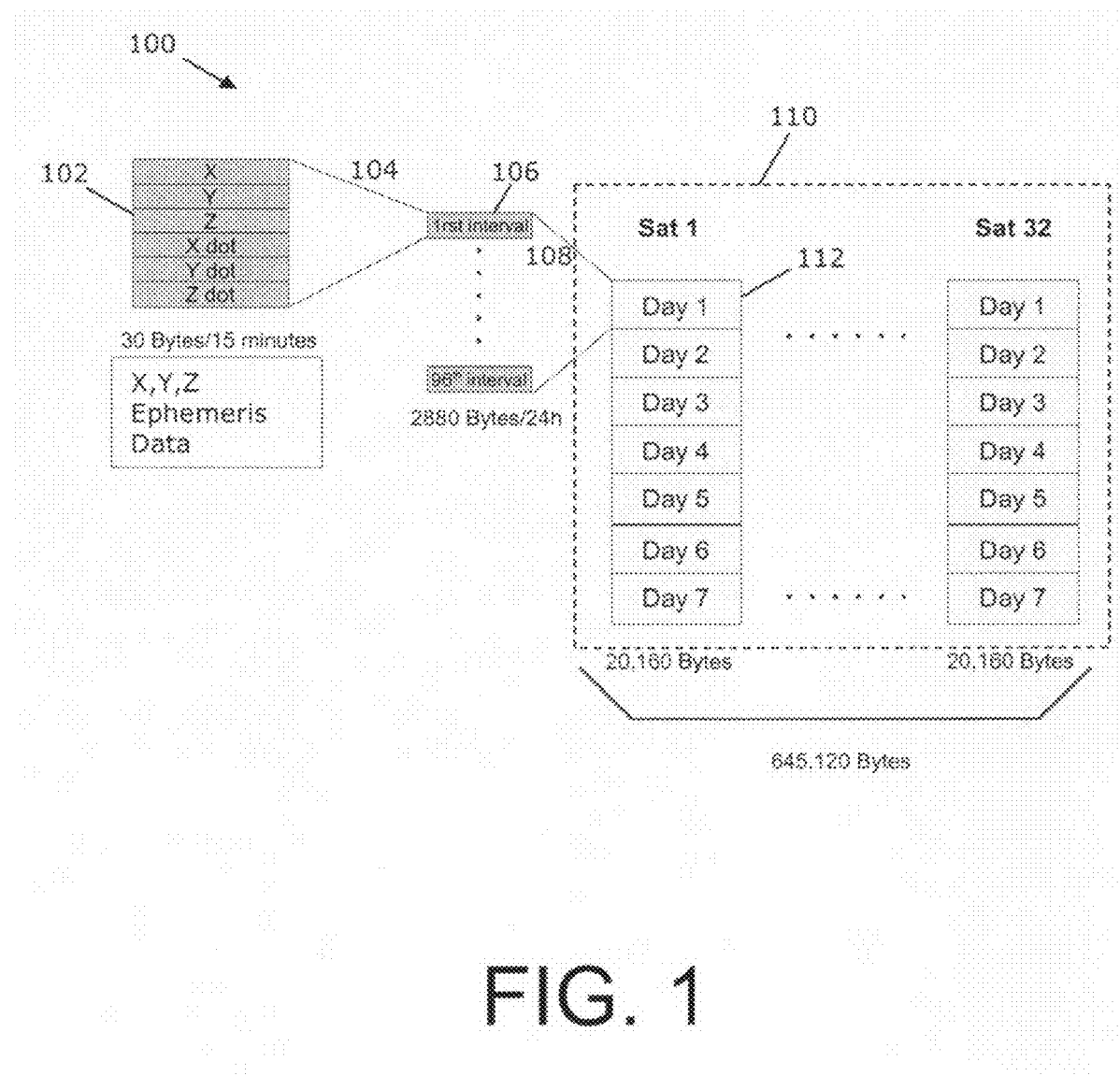
FIG. 1 shows a first extended ephemeris prediction file system flow.

The correction terms can be estimated by applying a least squares parameter fit to the difference between the model described above and satellite position prediction data in the form of, for example, spatial (x, y, and z) and time (t) coordinates. These coordinates can be provided for a certain time period into the future, as generated from data gathered at reference stations, for example those of the NASA Jet Propulsion Laboratory (JPL). An example of such data collected as a coherent file is shown in FIG. 1. The JPL prediction data has the advantages of being well-tested, accurate, and allowing for fast validation with low risk.

FIG. 1 shows an extended ephemeris prediction file system flow. Here the term "prediction file" means a collection of data useful for improving an ephemeris prediction. In system 100 X,Y,Z formatted data 102 such as that available from the JPL is collected. The data can present, for example, for each satellite, an X coordinate, a Y coordinate and a Z coordinate, as well as the first time derivatives of these coordinates X dot, Y dot and Z dot respectively for a given point in time $t_n$. The time between any $t_n$ and $t_{n+1}$ can be any amount of time, but in the embodiment shown in FIG. 1 is equal to fifteen minutes. In the embodiment shown in FIG. 1, each coordinate and coordinate derivative is represented by a five-byte data word, such that the data for each $t_n$ represents thirty bytes of data.

At step 104, data is collected from data 102 to form single days' worth of data 106 comprising ninety-six intervals each, or 2880 bytes worth of data for a single satellite on a single day. For a prediction file 110 that allows for seven days' 112 worth of prediction data for each of thirty-two satellites, the total file size would be 645,120 bytes. Of course, the length of the prediction file can be changed by adding or subtracting days depending on the needs of the system, thus trading overall accuracy and file size against the length of prediction data available.

Figure 2:
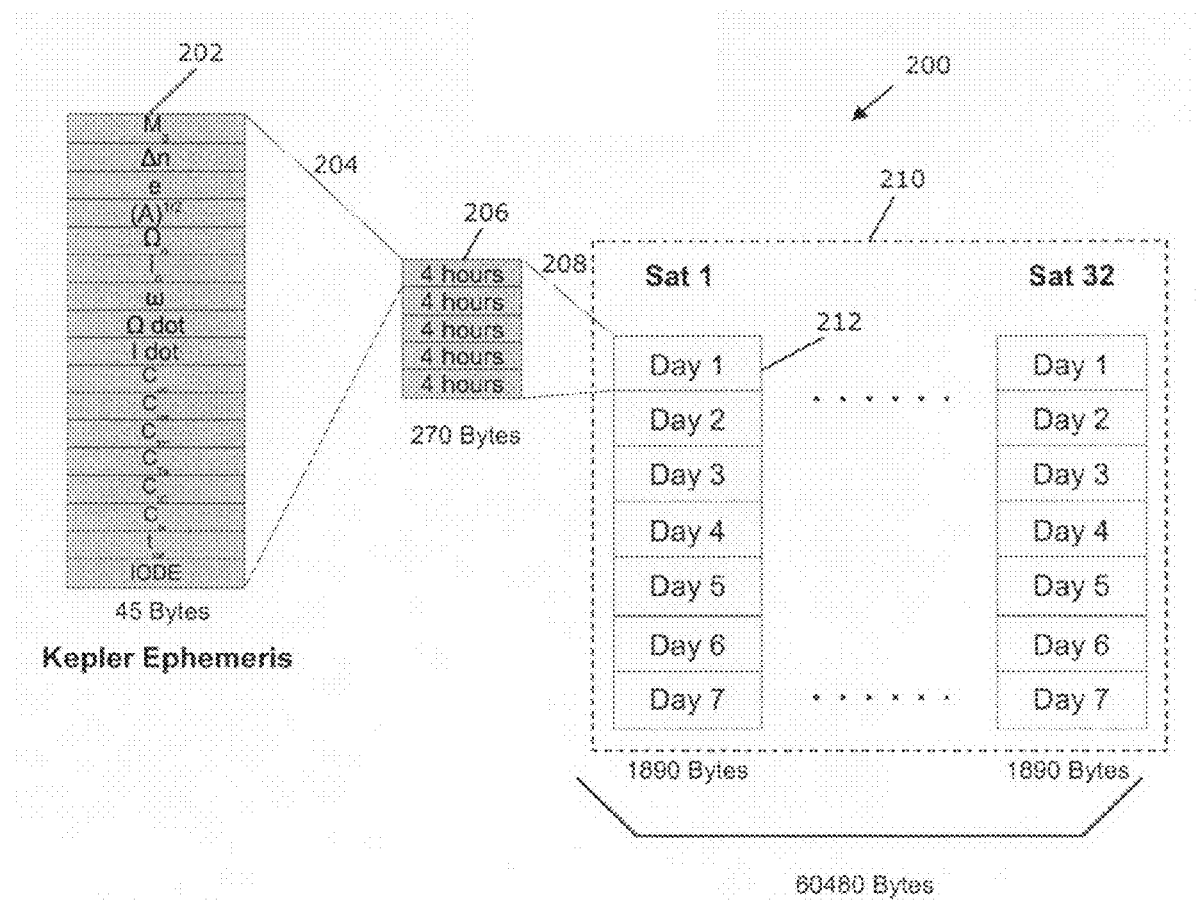
FIG. 2 shows a second extended ephemeris prediction file system flow

FIG. 2 shows a second extended ephemeris prediction file system flow 200. The system 200 models a set of satellite prediction data in four-hour intervals 206, instead of fifteen minute intervals as shown in FIG. 1. The system does this by taking satellite prediction data over a four-hour period and modeling it using standard broadcast ephemeris parameters 202. Each four-hour interval is collected into a set of four-hour intervals at step 204. Each set of four-hour intervals is packaged into a prediction file 210, which comprises a number of days' (here shown as seven) worth of prediction data for each satellite (here shown as thirty-two).

Using ephemeris parameters to model a multi-hour interval of data allows the data to be compacted. In contrast to the system shown in FIG. 1, twenty-four hours' worth of data comprises only 270 bytes, and seven days' worth of data 1890 Bytes. A seven-day prediction file for thirty-two satellites therefore comprises 60480 bytes.

Figure 3:
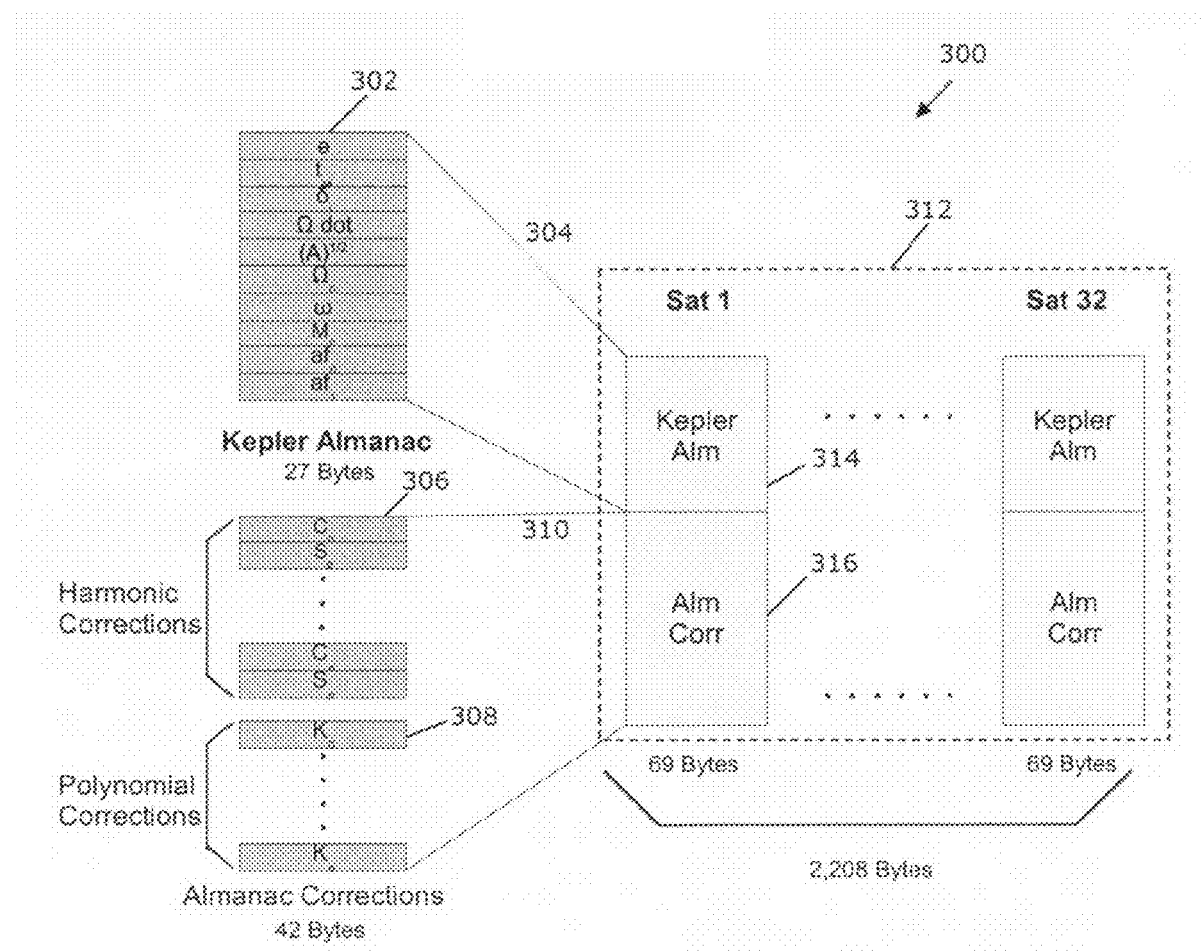
FIG. 3 shows a third extended ephemeris prediction file system flow

The size of the prediction file can be reduced even further using the almanac parameters to model intervals of data, as shown in FIG. 3. Here, the term "almanac data" refers to a collection of parameters for a longer-term model of a satellite's orbit, which would not normally offer a good enough prediction to locate a receiver's position. FIG. 3 illustrates a third extended ephemeris prediction file system flow 300 based on the use of almanac data. The system uses Kepler almanac parameters 302 to model longer intervals of data, shown in FIG. 3 as an entire weeks' worth of data. The Kepler almanac 302 for a satellite has ten parameters, which in a preferred embodiment is represented using twenty-seven bytes. In addition to the Kepler almanac, correction terms comprising harmonic correction terms 306 and polynomial correction terms 308 are generated. In a preferred embodiment, the correction terms 306 and 308 comprise in total forty bytes.

The Kepler almanac 302 and the correction terms 306 and 308 are collected in steps 304 and 310 into a prediction file. In a preferred embodiment, each satellite has sixty-seven bytes of data, comprising Kepler almanac parameters 314 and correction factors 316, which can comprise harmonic corrections 306 and polynomial correction factors 308. Of course, a person of skill in the art will understand that the exact choice of model parameters is modifiable to produce desired levels of accuracy and prediction file size. The total prediction file size shown in the embodiment of FIG. 3 can thereby be brought to less than one kilobyte per day for thirty-two satellites, in a preferred embodiment 2,144 Bytes for seven days for thirty-two satellites.

Since the position prediction (x, y, z, t) is quite good at the beginning of the prediction period, but degrades with the passing time, the weighting used during the least squares estimation can be decreased vs. time (square law vs. time). It is thereby possible to obtain a limited number of correction parameters, but with a modeling error which is still small at the beginning of the period, and then increases with the time, where its impact is less important, as the prediction error is quite large as well. This results in a smaller downloadable file size (less than 3 kB as shown in FIG. 3) than a prediction of broadcast ephemeris, which for a seven day period results in a download file size of about 60 kB, as shown in FIG. 2.

Figure 4:
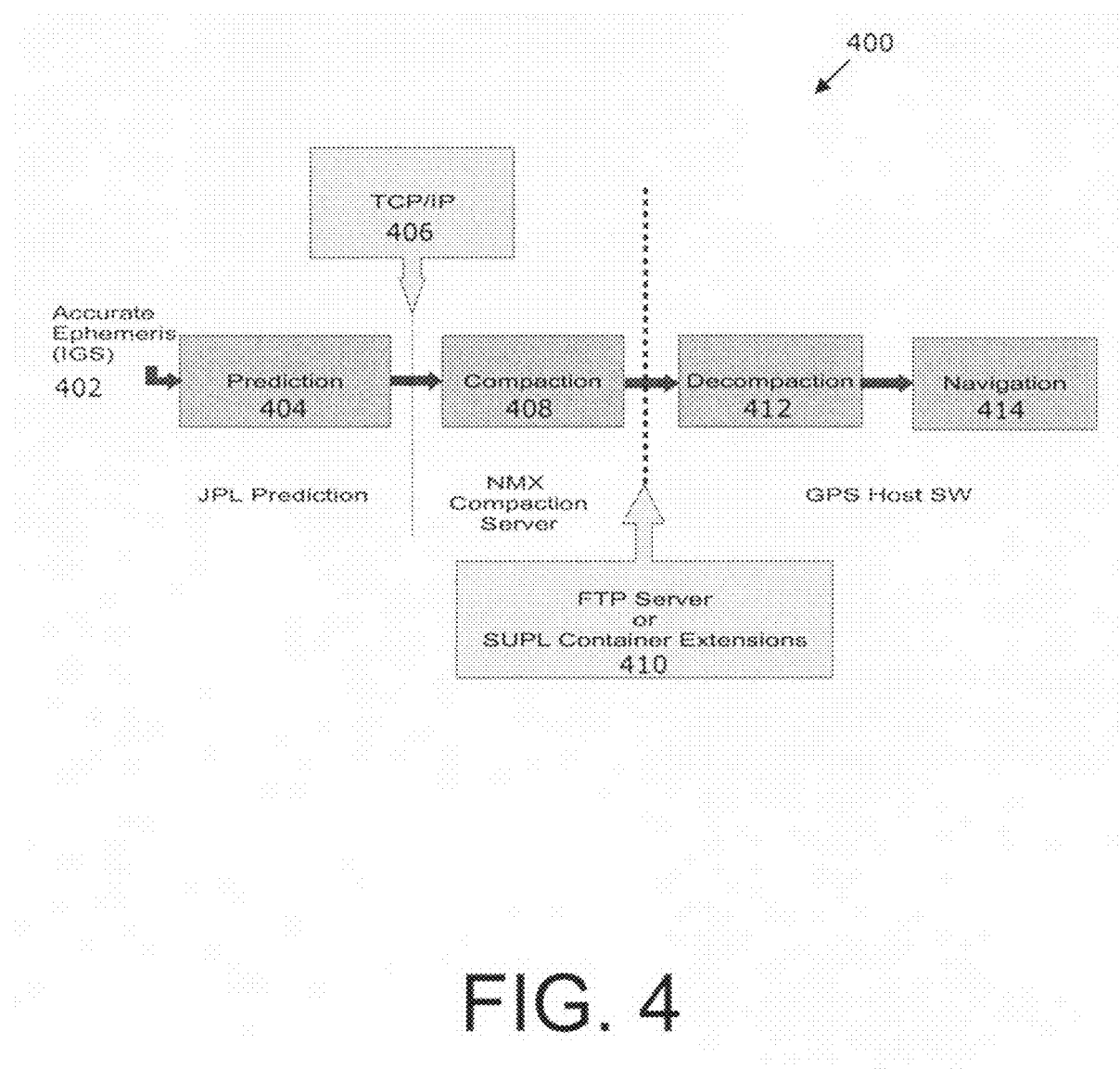
FIG. 4 shows a system useful for extended ephemeris use.

A theory of operation may be described in reference to the system shown in FIG. 4. FIG. 4 shows a system 400 used to estimate a position from an extended ephemeris prediction file. A set of reference stations (not shown) receives measurements 402 from the satellites (not shown). A current position, velocity, acceleration and jerk is computed from the measurements for each satellite. Using a force model, a sequence of positions, velocities, accelerations is derived by computation for a period going up to 7 days (depending on the sophistication of the model), at step 404. In a preferred embodiment, the interval between position points is 15 minutes. In parallel, from the satellite clock observation, a clock model is computed and used to predict the clock error and drift for the 7 next days.

The data describing satellite position with time and clock error and drift are sent in a preferred embodiment over TCP/IP network 408, which may be a network such as the Internet and may comprise landline, satellite or other wireless networks. At step 408, current almanac for a given satellite is selected and used to compute a set of satellite positions for the same 7 days in the future, at the same times when the position is available from the prediction. This effectively compacts the data describing satellite position with time and clock error, in a preferred embodiment according to the method shown in FIG. 3. At step 408, the position difference in x, y, z between almanac prediction and accurate prediction is computed over the whole time interval. Preliminary analysis shows that this error does not grow beyond 2 km over a one week period, and the difference is very smooth.

An estimate of the error in function of time is computed using an harmonic and polynomial model. The coefficients of the model are determined using a least squares formulation, minimizing the sum squared of the residuals. The number of parameters is estimated to 8 for harmonic model, and 3 for polynomial model. Other estimation techniques could be also used as a replacement to least squares.

Also at step 408, an extended ephemeris prediction file is created, including, in a preferred embodiment: ionospheric correction parameters (30 Bytes total), and per satellite, current almanac (10 parameters in 27 Bytes in compacted ICD-GPS200C format), 6 correction parameters for the X direction, 6 correction parameters for the Y direction, 6 correction parameters for the Z direction, and 3 parameters for satellite clock correction. Thus, for 32 satellites, the total number of correction parameters is: 32*(6*3+3)=672 parameters. Using two Bytes per parameter, the file size is about 3 kB (30+32*27+2*672=2238 Bytes), as is shown in FIG. 3, without ionospheric corrections.

The file is loaded into the GPS receiver by any means possible, including for example, by download during synchronization for a PDA (personal digital assistant), by FTP (File transfer protocol) from the web, during an A-GPS (Assisted Global Positioning System) session as ancillary information. An exemplary download using an FTP service or SUPL (Secure User Plane for Location) Container Extension download 410 is shown in FIG. 4.

Once a prediction file has been received at a receiver (as indicated by a vertical dashed line at step 410), a decompaction step can take place. When the GNSS receiver needs to compute a position, having acquired at least 4 satellites and having measurements available for them, but no broadcast ephemeris data, it first retrieves the almanac from the locally stored file, computes an X, Y, Z position from the almanac model at the required time. In parallel, it obtains the harmonic and polynomial correction terms, and computes the X, Y, Z corrections for the required time. In this context, obtaining a correction term means either looking up the term directly in a memory or deriving the term from data in a memory. The corrections are then applied to the X, Y, Z from the almanac model. Of course the corrections can be applied in any number of ways involving any number of mathematical operations and can include the alteration of almanac parameters directly. These correction terms ultimately affect the estimated satellite position. As used in this specification, an "estimated satellite position" means any data relating to the position of a satellite, such as a coordinate in a coordinate system.

Advantages of certain embodiments of the present invention include the relatively small file size, such that network bandwidth is saved at download time. Furthermore, the small file size makes use of the extended ephemerides better in assisted GPS situations, for example through the SUPL standard. Proper weighting of the least squares fit for correction parameters will decrease the likelihood of a large error during the first few days of the extended ephemeris data validity period. It should also be noted that the correction term does not need to be computed with a very accurate time: an accuracy of several seconds is sufficient. This is due to the smoothness of the correction terms, which in turn is due to the good overall prediction made by the almanac, which is adjusted to be correct in average for over one week.

One particular embodiment of the invention involves a method of calculating a position, comprising using a corrected almanac model to calculate the position of at least one satellite; and using signals received from the at least one satellite with the position of the at least one satellite to calculate a user position.

Another embodiment of the invention is a GNSS receiver, comprising a communications port for receiving an almanac correction model; a memory for storing almanac data; circuitry for receiving GNSS signals; and a processor for calculating the position of the receiver based on the received GNSS signals and the position of the GNSS transmitters as calculated from almanac data and the almanac correction model.

A further embodiment of the invention is a method for providing long-valadity satellite location data, comprising forming a satellite orbit model based on an available model accurate to within 3 km and providing correction data to increase the accuracy of predictions from the satellite orbit model when used in conjunction with the corrections.

Still another embodiment of the invention involves a method for generating a first satellite orbit model, comprising receiving data related to a predicted position of a satellite in orbit, using a second satellite orbit model to generate a further set of predictions, and generating a set of correction terms that correct the results of the second satellite orbit model to those of the first satellite orbit model.

Still another embodiment of the invention involves a method for generating a first satellite orbit model, comprising receiving data related to a predicted position of a satellite in orbit, using a second satellite orbit model to generate a further set of predictions, and generating a set of correction terms that correct the results of the second satellite orbit model to those of the first satellite orbit model, wherein the step of generating a set of correction terms comprises generating a set of correction terms for a multi-day period using a least-squares approach; and wherein the step of generating a set of correction terms further comprises weighting earlier data related to a predicted position of a satellite more heavily than later data related to a predicted position of a satellite.

What is claimed is:

1. A method for improving the accuracy of a receiver position, comprising:
   receiving a prediction file comprising almanac correction data and fewer than 60480 bytes;
   using the almanac correction data with almanac data to produce a corrected satellite location; and
   using the corrected satellite location to calculate a receiver position;
   wherein the almanac correction data is usable for seven days to generate corrected satellite locations accurate to within thirty meters.

2. The method of claim 1, wherein the step of using the almanac correction data with almanac data to produce a corrected satellite location comprises obtaining a correction term from the prediction file and applying the term to an estimated satellite position.

3. The method of claim 2, wherein the prediction file is based on data which is received from a network.

4. A method for generating an extended ephemeris prediction file, comprising:
   obtaining data comprising a prediction of a satellite orbit;
   computing correction terms related to a difference between the prediction of a satellite orbit and a second prediction resulting from almanac data;
   wherein the prediction file comprises less than 60480 Bytes and is usable for seven days to generate corrected satellite locations accurate to within thirty meters.

5. The method of claim 4, wherein the step of computing correction terms related to a difference between the prediction of a satellite orbit and a second prediction resulting from almanac data further comprises using both a harmonic model and a polynomial model.

6. The method of claim 4, further comprising the step of computing correction terms for satellite clock data.

7. The method of claim 4, further comprising transmitting the prediction file over a SUPL network.

8. The method of claim 4, wherein the prediction file comprises less than one kilobyte per day of validity.

9. The method of claim 4, wherein the step of computing correction terms related to a difference between the prediction of a satellite orbit and a second prediction resulting from almanac data further comprises applying a least squares methodology to minimize the difference between the prediction of satellite orbit and the second prediction.

10. The method of claim 9, wherein the step of applying a least squares methodology to minimize the difference between the prediction of satellite orbit and the second prediction further comprises weighting data from the prediction of satellite orbit that is further in the future less than data from the prediction of satellite orbit that is nearer in the future.

11. A computer readable medium having computer code embedded therein that, when executed, would carry out a method for generating an extended ephemeris prediction file, comprising:
   obtaining data comprising a prediction of a satellite orbit;
   computing correction terms related to a difference between the prediction of a satellite orbit and a second prediction resulting from almanac data;
   wherein the prediction file comprises less than 60480 Bytes and is usable for seven days to generate corrected satellite locations accurate to within thirty meters.

12. The computer readable medium of claim 11, wherein the method step of computing correction terms related to a difference between the prediction of a satellite orbit and a second prediction resulting from almanac data further comprises using both a harmonic model and a polynomial model.

13. The computer readable medium of claim 11, wherein the method further comprises the step of computing correction terms for satellite clock data.

14. The computer readable medium of claim 11, wherein the method further comprises transmitting the prediction file over a SUPL network.

15. The computer readable medium of claim 11, wherein the prediction file comprises less than one kilobyte per day of validity.

16. The computer readable medium of claim 11, wherein the step of computing correction terms related to a difference between the prediction of a satellite orbit and a second prediction resulting from almanac data further comprises applying a least squares methodology to minimize the difference between the prediction of satellite orbit and the second prediction.

17. The computer readable medium of claim 16, wherein the step of applying a least squares methodology to minimize the difference between the prediction of satellite orbit and the second prediction further comprises weighting data from the prediction of satellite orbit that is further in the future less than data from the prediction of satellite orbit that is nearer in the future.

18. A GNSS receiver, comprising:
a communications port for receiving an almanac correction model;
a memory for storing almanac data;
circuitry for receiving GNSS signals; and
a processor for calculating the position of the receiver based on the received GNSS signals and the position of a GNSS transmitter as calculated from almanac data and the almanac correction model;
wherein the processor is configured to use the almanac correction model to generate corrected satellite locations, wherein each such location generated during a seven-day period is accurate to within thirty meters.

19. The GNSS receiver of claim 18, wherein the processor for calculating the position of the receiver based on the received GNSS signals and the position of a GNSS transmitter as calculated from almanac data and the almanac correction model is configured to calculate a corrected estimated GNSS transmitter position based on a harmonic correction model and a polynomial correction model.

* * * * *